United States Patent
Tang et al.

(10) Patent No.: US 9,725,544 B2
(45) Date of Patent: Aug. 8, 2017

(54) PREPARATION OF CONJUGATED AROMATIC/HETEROAROMATIC OLIGOMER-CONTAINING DIELECTRIC POLYMERS AND THEIR APPLICATIONS

(71) Applicant: University of South Carolina, Columbia, SC (US)

(72) Inventors: Chuanbing Tang, Columbia, SC (US); Yali Qiao, Columbia, SC (US); Harry J. Ploehn, Columbia, SC (US); MD. Sayful Islam, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 15/159,907

(22) Filed: May 20, 2016

(65) Prior Publication Data

US 2016/0264702 A1    Sep. 15, 2016

Related U.S. Application Data

(62) Division of application No. 14/160,879, filed on Jan. 22, 2014, now Pat. No. 9,346,906.

(60) Provisional application No. 61/755,155, filed on Jan. 22, 2013.

(51) Int. Cl.
| | |
|---|---|
| *C08F 28/06* | (2006.01) |
| *C08F 220/38* | (2006.01) |
| *C08F 220/30* | (2006.01) |
| *C08F 220/60* | (2006.01) |
| *C08F 293/00* | (2006.01) |
| *C08F 220/36* | (2006.01) |

(52) U.S. Cl.
CPC .......... *C08F 220/38* (2013.01); *C08F 220/30* (2013.01); *C08F 220/60* (2013.01); *C08F 293/005* (2013.01); *C08F 2220/302* (2013.01); *C08F 2220/365* (2013.01); *C08F 2220/387* (2013.01); *C08F 2220/606* (2013.01)

(58) Field of Classification Search
CPC . C08F 28/06; C08F 2220/606; C08F 293/005
See application file for complete search history.

(56) References Cited

FOREIGN PATENT DOCUMENTS

JP    2008 239987    9/2008

OTHER PUBLICATIONS

Ohsedo (Journal of Polymer Science: Part B: Polymer Physics, 41 (2003) 2471-2484).*
Moad (Polymer, 49 (2008) 1079-1131).*
Mishra et al., "Functional Oligothiophenes: Molecular Design for Multidimensional Nanoarchitectures and Their Applications" Chem. Rev. 2009, 109, 1141-1276.
Panzer et al., "Polymer Electrolyte-Gated Organic Field-Effect Transistors: Low-Voltage, High-Current Switches for Organic Electronics and Testbeds for Probing Electrical Transport at High Charge Carrier Density" J. Am. Chem. Soc. 2007, 129, 6599-6607.
Hu et al., "Charge Trapping and Storage by Composite P3HT/PC$_{60}$BM Nanoparticles Investigated by Fluorescence-Voltage/Single Particle Spectroscopy" J. Am. Chem. Soc. 2011, 133, 20850-20856.
Kamkar et al., "Single Nanowire OPV Properties of a Fullerene-Capped P3HT Dyad Investigated Using Conductive and Photoconductive AFM" ACS Nano 2012, 6,2, 1149-1157.
Melucci et al., "Shaping Thiophene Oligomers into Fluorescent Nanobeads Forming Two-Dimensionally Patterned Assemblies by the Capillary Effect", Macromolecules 2005, 38, 10050-10054.
Kumar et al., "Hierarchical Self-Assembly of Semiconductor Functionalized Peptide α-Helices and Optoelectronic Properties" J. Am. Chem. Soc. 2011, 133, 8564-8573.
Ranieri et al., "Synthesis and characterization of thienyl—and terthienyl-group bearing methacrylic polymers as precursors for grafting reactions of thiophene-side chains" Polym. Int. 1999, 48, 1091-1098.
Ohsedo et al., "Synthesis and Electrochromic Properties of a New Family of Methacrylate Polymers Containing Pendant Oligothiophenes" J. of Polym. Sci., Part B: Polym. Phys. 41 (2003) 2471-2484.

* cited by examiner

*Primary Examiner* — Kuo-Liang Peng
(74) *Attorney, Agent, or Firm* — Dority & Manning, P.A.

(57) ABSTRACT

A π-conjugated aromatic/heteroaromatic oligomer-containing vinyl monomer is generally provided, which can include a polymerizable group, a linker group, and a π-conjugated aromatic/heteroaromatic side chain. The π-conjugated aromatic/heteroaromatic side chain includes a first cyclopentadiene ring covalently attached to the linder group, a set of second cyclopentadiene rings covalently attached to the first cyclopentadiene ring, and a third cyclopentadiene ring positioned at a terminal end of the π-conjugated aromatic/heteroaromatic side chain such that the set of second cyclopentadiene rings is positioned between the first cyclopentadiene ring and the third cyclopentadiene ring. Methods are also provided for forming a polymer via polymerizing the π-conjugated aromatic/heteroaromatic oligomer-containing vinyl monomer, and for grafting a π-conjugated aromatic/heteroaromatic oligomer-containing polymer onto a surface of a nanomaterial.

7 Claims, 8 Drawing Sheets

PREPARATION OF CONJUGATED AROMATIC/HETEROAROMATIC OLIGOMER-CONTAINING DIELECTRIC POLYMERS AND THEIR APPLICATIONS

PRIORITY INFORMATION

The present application claims priority to, and is a divisional application of, U.S. patent application Ser. No. 14/160,879 titled "Preparation of Conjugated Aromatic/Heteroaromatic Oligomer-Containing Dielectric Polymers and Their Applications" of Tang, et al. filed on Jan. 22, 2014, and claims priority to U.S. Provisional Patent Application Ser. No. 61/755,155 titled "Preparation of Conjugated Aromatic/Heteroaromatic Oligomer-Containing Dielectric Polymers and Their Applications" of Tang, et al. filed on Jan. 22, 2013, the disclosure of which is incorporated by reference herein.

GOVERNMENT SUPPORT CLAUSE

This invention was made with government support under N000141110191 awarded by the Office of Naval Research. The government has certain rights in the invention.

BACKGROUND

Polythiophenes, oligothiophenes and their functional derivatives have attracted much interest and have been among the most frequently used π-conjugated materials as active components in organic electronic devices and molecular electronics, including in devices such as OLEDs, OFETs, OPVs and chemo/biosensors. Among thiophene-based polymeric materials, oligothiophene moieties are generally placed in the main-chain architecture. For example, poly(3-alkylthiophene) (P3ATs) and their derivatives are one series of the most developed main-chain thiophene-based polymeric materials, which show very promising optoelectronic properties and great potential in OFET and OPV applications. Compared with the main-chain thiophene-based polymers, side-chain oligothiophene/its derivatives-containing polymers have been much less explored. Though synthesis for methacrylate with terthiophene-containing side-chain was reported previously, most side-chain π-conjugated aromatic/heteroaromatic oligomer-containing vinyl monomers haven't been synthesized, and especially, polymers based on such aromatic/heteroaromatic oligomer-containing monomers, including methacrylate with terthiophene-containing side chain, haven't been investigated yet by using controlled/living radical polymerization methods, for example, reversible addition fragmentation transfer (RAFT) polymerization. Moreover, there are few reports on the potentials of such side-chain aromatic/heteroaromatic oligomer-containing polymers in organic optoelectronic devices and molecular electronics, in particular, their applications in capacitors haven't been studied yet. Compared with main-chain P3AT polymers, it is much easier to tune the polymer structures of side-chain polymers by changing the monomer structures.

As such, a need exists for methods of preparing, via controlled methods, a side chain side-chain aromatic/heteroaromatic oligomer that has a polymerizable group for further polymerization.

SUMMARY

Objects and advantages of the invention will be set forth in part in the following description, or may be obvious from the description, or may be learned through practice of the invention.

A π-conjugated aromatic/heteroaromatic oligomer-containing vinyl monomer is generally provided, along with methods of their methods of formation. In one embodiment, the π-conjugated aromatic/heteroaromatic oligomer-containing vinyl monomer comprises a polymerizable group, a linker group, and a π-conjugated aromatic/heteroaromatic side chain. The polymerizable group can include a vinyl group, and the π-conjugated aromatic/heteroaromatic side chain can include a first cyclopentadiene ring covalently attached to the linder group, a set of second cyclopentadiene rings covalently attached to the first cyclopentadiene ring, and a third cyclopentadiene ring positioned at a terminal end of the π-conjugated aromatic/heteroaromatic side chain such that the set of second cyclopentadiene rings is positioned between the first cyclopentadiene ring and the third cyclopentadiene ring. The first cyclopentadiene ring can have a substituted or unsubstituted first hetero-atom substituted therein. The set of second cyclopentadiene rings can include a number (n) of repeating second cyclopentadiene rings covalently bonded together in a chain, with n being an integer of 1 to about 25, with each of the second cyclopentadiene rings having a substituted or unsubstituted second hetero-atom substituted therein. Finally, the third cyclopentadiene ring can have a substituted or unsubstituted third hetero-atom substituted therein.

A method is also generally provided for forming a polymer via polymerizing the π-conjugated aromatic/heteroaromatic oligomer-containing vinyl monomer, such as described above, via a controlled/living radical polymerization method.

A method is also generally provided for grafting a π-conjugated aromatic/heteroaromatic oligomer-containing polymer onto a surface of a nanomaterial. In one embodiment, the method can include polymerizing (e.g., via a free radical polymerization or a controlled/living polymerization method) the π-conjugated aromatic/heteroaromatic oligomer-containing vinyl monomer, such as described above, in the presence of an anchored nanomaterial, wherein the anchored nanoparticle comprises an anchoring group attached the surface of the nanomaterial.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

DEFINITIONS

Figure 1A:
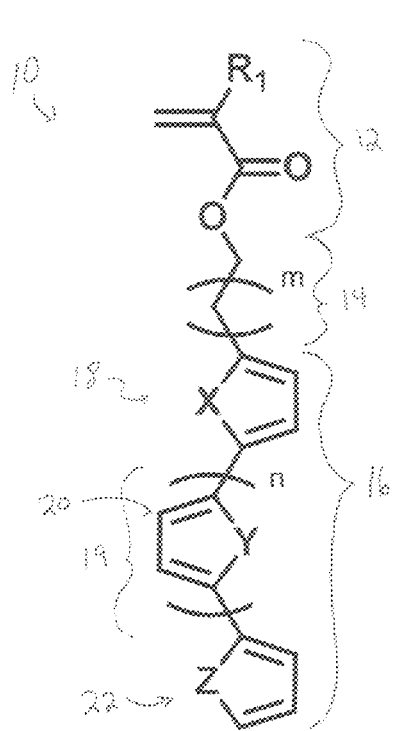
FIG. 1a shows an exemplary π-conjugated aromatic/heteroaromatic oligomer based vinyl monomer having a methacrylate polymerizable group.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random symmetries.

The term "organic" is used herein to refer to a class of chemical compounds that are comprised of carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.).

The "number average molecular weight" ($M_n$) is readily calculated by one of ordinary skill in the art, and generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

where $N_i$ is the number of molecules of molecular weight $M_i$. The number average molecular weight of a polymer can be determined by gel permeation chromatography, viscometry (Mark-Houwink equation), and all colligative methods, like vapor pressure osmometry or end-group determination.

The "weight average molecular weight" ($M_w$) is readily calculated by one of ordinary skill in the art, and generally refers to:

$$\overline{M}_w = \frac{\sum_i N_i M_i^2}{\sum_i N_i M_i}$$

where $N_i$ is the number of molecules of molecular weight $M_i$. The weight average molecular weight can be determined by light scattering, small angle neutron scattering (SANS), X-ray scattering, and sedimentation velocity.

The polydispersity index (PDI) is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity (i.e., 1).

As used herein, the prefix "nano" refers to the nanometer scale (e.g., from about 1 nm to about 999 nm). For example, particles having an average diameter on the nanometer scale (e.g., from about 1 nm to about 999 nm) are referred to as "nanoparticles". Particles having an average diameter of greater than 1,000 nm (i.e., 1 μm) are generally referred to as "microparticles", since the micrometer scale generally involves those materials having an average size of greater than 1 μm.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Methods are generally provided for the synthesis of π-conjugated aromatic/heteroaromatic oligomer-containing vinyl monomers, along with methods of their polymerization via controlled/living radical polymerization methods, and the resulting polymers' applications and uses (e.g., as dielectric materials). In various embodiments, an aromatic/heteroaromatic oligomer is attached as the side groups of the monomers and resulting polymers. As explained in greater detail below, the side-chain aromatic/heteroaromatic oligomer-containing polymers can include acrylates, methacrylates, styrenes, acrylamides, norbornenes, etc. The present disclosure is further directed to the resulting polymers and methods of their use.

The presently disclosed methods and materials have the potential for many other polymer systems to be applied in a similar fashion to obtain controlled properties. As such, the strategy described herein not only offers the diversity of structures of different monomer and polymer systems, but also tailored properties. Thus, this strategy enables side-chain π-conjugated aromatic/heteroaromatic oligomer based polymers with novel properties.

I. Monomers

In one embodiment, methods are generally provided for preparing π-conjugated aromatic/heteroaromatic oligomer-containing vinyl monomers. As discussed in greater detail below, such vinyl monomers prepared with pendant π-conjugated aromatic/heteroaromatic oligomers can result in polymer molecules with these oligomers as functional side groups.

Generally, each monomer includes a polymerizable group attached to the π-conjugated aromatic/heteroaromatic side chain via an organic linker group. Referring to the exemplary embodiments shown in FIGS. 1a-1e, the each monomer 10 includes a polymerizable group 12 attached to an organic linker group 14 and π-conjugated aromatic/heteroaromatic side chain 16, such that the organic linker group 14 is positioned between and covalently links the polymerizable group 12 to the π-conjugated aromatic/heteroaromatic side chain 16.

a. π-Conjugated Aromatic/Heteroaromatic Oligomer Side Chains

As shown in FIGS. 1a-1e, the π-conjugated aromatic/heteroaromatic side chain 16 includes a first cyclopentadiene ring 18 having X substituted therein and covalently attached to the linker group 14. Generally, X can be a substituted or unsubstituted hetero-atom (i.e., a non-carbon atom). In particular embodiments, the substituted or unsubstituted hetero-atom of X is selected from the group of the IIIA (e.g., B, Al, Ga, In, and Ti), IVA (e.g., Si, Ge, Sn, Pb, and Fl), VA (e.g., N, P, As, Sb, and Bi), or VIA (e.g., O, S, Se, Te, and Po) family of elements of the Periodic Table. In one particular embodiment, X is selected from boron (B), silicon (Si), nitrogen (N), oxygen (O), sulfur (S), and phosphorus (P), with the appropriate valence number of hydrogen atoms attached (i.e., two H present if Si; one H if N or P; no H present if O or S, etc.).

A set 19 of second cyclopentadiene rings 20 are covalently attached to the first cyclopentadiene ring 18. The set 19 is formed by a number (n) of repeating second cyclopentadiene rings 20 covalently bonded together in a chain. In particular embodiments, n is an integer of 1 to about 25, such as 1 to about 20 (e.g., about 2 to about 10). As shown, each of the second cyclopentadiene rings 20 are substituted with Y within the ring structure. Generally, Y can be a substituted or unsubstituted hetero-atom (i.e., a non-carbon atom), which can be the same or different that X in the first cyclopentadiene ring 18. In particular embodiments, the substituted or unsubstituted hetero-atom of Y is selected from the group of the IIIA (e.g., B, Al, Ga, In, and Ti), IVA (e.g., Si, Ge, Sn, Pb, and Fl), VA (e.g., N, P, As, Sb, and Bi), or VIA (e.g., O, S, Se, Te, and Po) family of elements of the Periodic Table. In one particular embodiment, Y is selected from boron (B), silicon (Si), nitrogen (N), oxygen (O), sulfur (S), and phosphorus (P), with the appropriate valence number of hydrogen atoms attached (i.e., two H present if Si; one H if N or P; no H present if O or S, etc.).

A third cyclopentadiene ring 22 is positioned at the terminal end of the π-conjugated aromatic/heteroaromatic side chain 16 such that the set 19 of second cyclopentadiene rings 20 is positioned between the first cyclopentadiene ring 18 and the third cyclopentadiene ring 22. As shown, the third cyclopentadiene ring 22 is substituted with Z within the ring structure. Generally, Z can be a substituted or unsubstituted hetero-atom (i.e., a non-carbon atom), which can be the same or different that X in the first cyclopentadiene ring 18 and/or Y in the second cyclopentadiene ring structure 20. In particular embodiments, the substituted or unsubstituted hetero-atom of Z is selected from the group of the IIIA (e.g., B, Al, Ga, In, and Ti), IVA (e.g., Si, Ge, Sn, Pb, and Fl), VA (e.g., N, P, As, Sb, and Bi), or VIA (e.g., O, S, Se, Te, and Po) family of elements of the Periodic Table. In one particular embodiment, Z is selected from boron (B), silicon (Si), nitrogen (N), oxygen (O), sulfur (S), and phosphorus (P), with the appropriate valence number of hydrogen atoms attached (i.e., two H present if Si; one H if N or P; no H present if O or S, etc.).

In particular embodiments, the π-conjugated aromatic/heteroaromatic oligomer side-chain moiety can be five-membered or six-membered aromatic/heteroacromatic oligomers (in total number, such that n is 3 or 4, respectively) and their derivatives, which include both linear and cyclic aromatic/heteroacromatic oligomers, and various fused aromatic/heteroacromatic oligomers, such as thiophene, pyrrole, furan, selenophene, thiazole, oxazole, imidiazole, benzene, pyridine, indole, benzothiazole, benzothiadiazole dibenzothiophene, carbazole, fluorene, triphenylamine, phthalocyanine and its metal-containing derivatives, porphyrin and its metal-containing derivatives, etc., with repeat unit number ranging from 2 to 12, etc.

b. Organic Linker Group

Diverse linker groups 14 can be positioned between the polymerizable group 12 (i.e., containing the vinyl group) and the π-conjugated aromatic/heteroaromatic side chain 16. As shown in the exemplary embodiments of FIGS. 1a-1c and 1e, the organic linker group 14 can be a simple alkyl chain having a number (m) of repeating carbon atoms (each with two hydrogen atoms thereon, i.e., —$CH_2$—), with m being an integer of 1 to about 50, such as 2 to about 40 (e.g., about 2 to about 20). In one particular embodiment, m is about 2 to about 12. Although not shown in the exemplary embodiments of FIGS. 1a-1c and 1e, the alkyl chain of the organic linker group 14 can be substituted with common substituents found on alkyl chains (e.g., hydroxyl groups, amine groups, etc.).

Figure 1B:
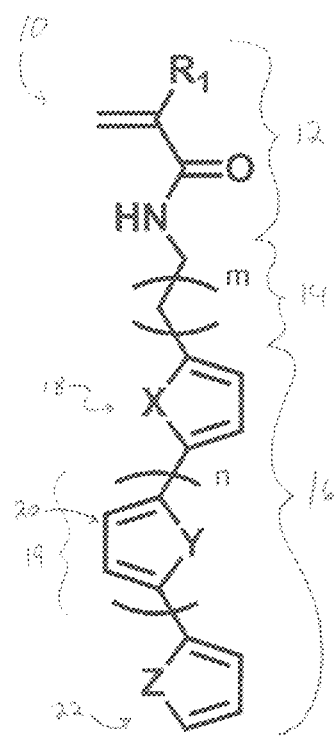
FIG. 1b shows an exemplary π-conjugated aromatic/heteroaromatic oligomer based vinyl monomer having an acrylate polymerizable group.
Figure 1C:
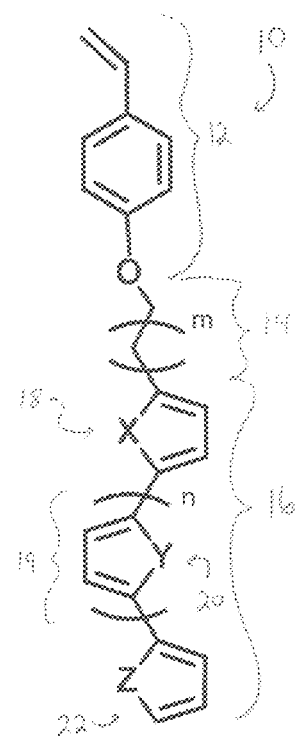
FIG. 1c shows an exemplary π-conjugated aromatic/heteroaromatic oligomer based vinyl monomer having a styrene polymerizable group.
Figure 1D:
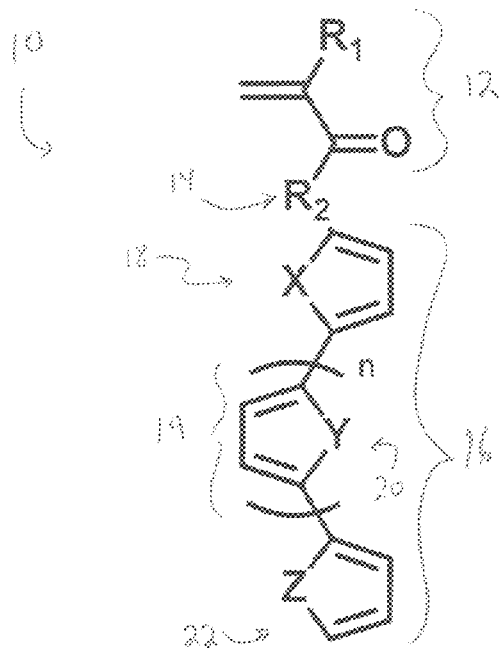
FIG. 1d shows an exemplary π-conjugated aromatic/heteroaromatic oligomer based vinyl monomer having an acrylamide polymerizable group.

In the exemplary embodiment of FIG. 1d, $R_2$ can be any organic linkage containing O or NH and having 1 to 50 carbon atoms, including but not limited to, substituted (cyclo)alkyl groups, substituted or unsubstituted (hetero) aryl groups, substituted or unsubstituted heterocyclic groups, etc.

c. Polymerizable Groups

The polymerizable group 12 of the π-conjugated aromatic/heteroaromatic oligomer monomers 10 can include a vinyl group, such as an acrylic group, a methacrylic group, a styrenic group, an acrylamide group, or a norbornene group.

For example, FIGS. 1a and 1d show exemplary monomers 10 having a (meth)acrylic group forming its polymerizable group 12, with $R_1$ being either H (i.e., an acrylic group) or —$CH_3$ (i.e., a methacrylic group).

FIG. 1b shows an exemplary monomer 10 having a (meth)acrylamide group forming its polymerizable group 12, with $R_1$ being either H (i.e., an acrylamide group) or —$CH_3$ (i.e., a methacrylamide group).

FIG. 1c shows an exemplary monomer 10 having a styrenic group attached to the linker group 14 via an oxygen atom.

Figure 1E:
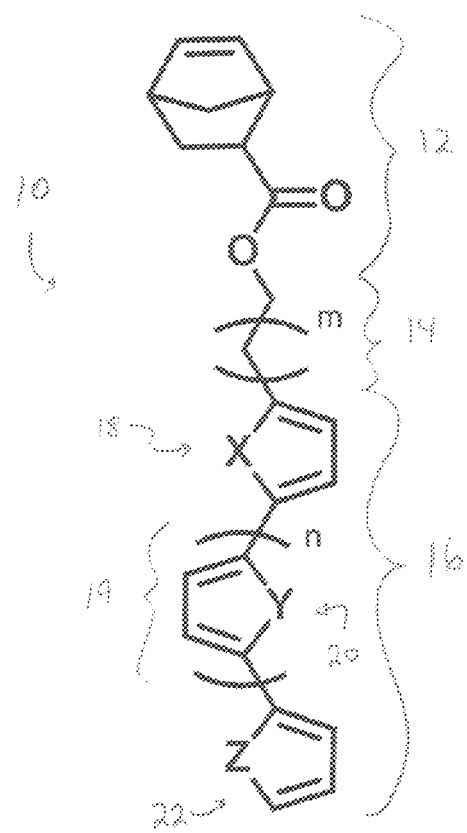
FIG. 1e an exemplary π-conjugated aromatic/heteroaromatic oligomer based vinyl monomer having a norbornene-type polymerizable group.

FIG. 1e shows an exemplary monomer 10 having a norbornene group attached to the linker group 14 via an ester group.

No matter the particular chemistry of the polymerizable group 12, a vinyl group is present and configured for polymerization into a polymeric chain.

d. Exemplary Monomers

Figure 2A:
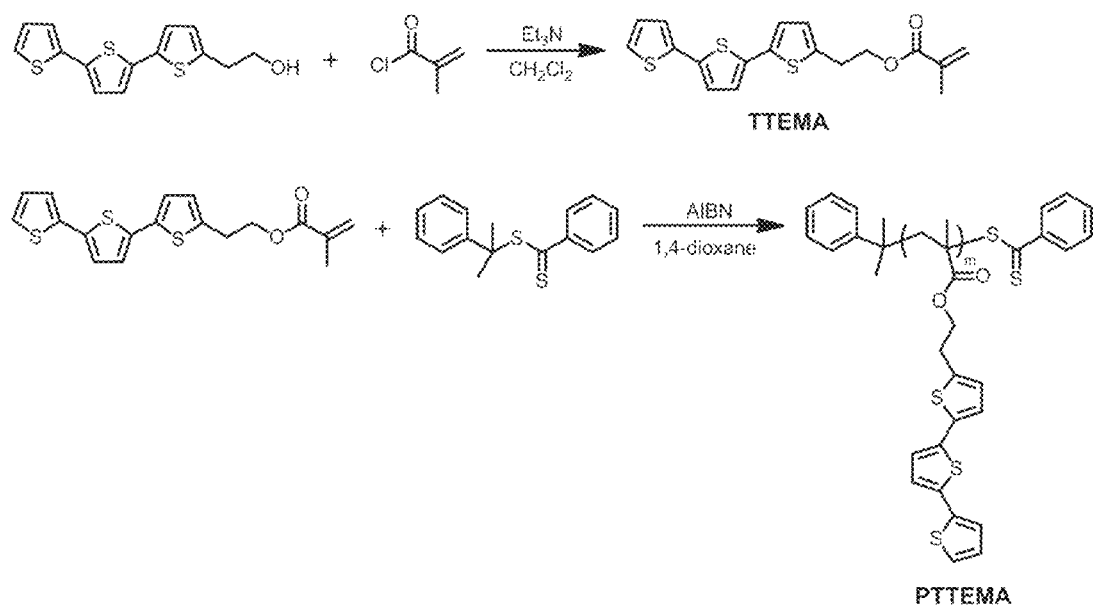
FIG. 2a shows an example of preparation of a π-conjugated aromatic/heteroaromatic oligomer-containing methacrylic monomer, 2(2,2':5',2"-terthien-5-yl)ethyl methacrylate (TTEMA) and an exemplary corresponding homopolymer.

FIGS. 1a-1e illustrate exemplary embodiments that are generally discussed above. In particular, each of the exemplary embodiments shown include vinyl monomers with aromatic/heteroaromatic oligomer at the end of the pendant group. The linkers between aromatic/heteroaromatic oligomer and vinyl groups can have different lengths ranging from 2 carbons to 12 carbons. For example, 2(2,2':5',2"-terthien-5-yl)ethyl methacrylate (TTEMA) is prepared by esterification reaction between 2(2,2':5',2"-terthien-5-yl) ethanol (TTE) and methacryloyl chloride in the presence of triethylamine in dichloromethane, as shown in FIG. 2a. Another example is 2(2,2':5',2"-terthien-5-yl)ethyl norbornenate (TTENB), which is also prepared by esterification reaction between TTE and 5-norbornene-2-carbonyl chloride under the same experimental condition, as demonstrated in FIG. 2b.

II. Polymerization and Resulting Polymers

In various aspects, methods are generally provided for the preparation of π-conjugated aromatic/heteroaromatic oligomer-containing vinyl monomers (e.g., those described above) and polymers prepared from these monomers. In particular, π-conjugated aromatic/heteroaromatic oligomer-containing polymers can be prepared by free radical and controlled/living radical polymerization of the vinyl monomers prepared with pendant π-conjugated aromatic/heteroaromatic oligomers. Polymer compositions include homopolymers, random copolymers, and block copolymers (linear copolymer, star copolymers, bottle-brush copolymers, etc.). These polymers have π-conjugated aromatic/heteroaromatic oligomer moiety at the side-chain.

Generally, the polymerization method for the synthesis of π-conjugated aromatic/heteroaromatic oligomer-containing polymers uses controlled/living radical polymerization methods to yield polymers having applications in many fields, such as dielectric materials, optical and electronic materials, nanolithography, etc.

In summary of particular embodiments, methods are provided for preparing π-conjugated aromatic/heteroaromatic oligomer vinyl monomers and polymers, wherein:

(i) said π-conjugated aromatic/heteroaromatic oligomer vinyl monomers include acrylate monomers, methacrylate monomers, styrene monomers, acrylamide monomers and norbornene monomers that can be polymerized;

(ii) said π-conjugated aromatic/heteroaromatic oligomer side-chain moiety that can be five-/six-membered aromatic/heteroacromatic oligomers and their derivatives, which include both linear and cyclic aromatic/heteroacromatic oligomers, and various fused aromatic/heteroacromatic oligomers, such as thiophene, pyrrole, furan, selenophene, thiazole, oxazole, imidiazole, benzene, pyridine, indole, benzothiazole, benzothiadiazole dibenzothiophene, carbazole, fluorene, triphenylamine, phthalocyanine and its metal-containing derivatives, porphyrin and its metal-containing derivatives, etc., with repeat unit number ranging from 2 to 12, etc.

(iii) said homopolymers, random copolymers, block copolymers (linear copolymers, star copolymers, bottle-brush copolymers, etc.) that derive from polymerization of π-conjugated aromatic/heteroaromatic oligomer vinyl monomers.

(iv) said homopolymers, random copolymers, block copolymers (linear copolymers, star copolymers, bottle-brush copolymers, etc.) that have controllable linkers between the polymer backbone and the aromatic/heteroaromatic oligomer functional group moiety.

(v) said homopolymers, random copolymers, block copolymers (linear copolymers, star copolymers, bottle-brush copolymers, etc.) that have applications as dielectric materials for capacitors.

As shown in the exemplary embodiments of the Examples below, the synthesis of π-conjugated aromatic/heteroaromatic oligomer based vinyl monomers has been demonstrated. The monomers include acrylic, methacrylic, styrenic, acrylamide and norbornene monomers. FIGS. 1a-1e illustrate a general embodiment: vinyl monomers with aromatic/heteroaromatic oligomer at the end of pendant group. In particular embodiment, the linkers between aromatic/heteroaromatic oligomer and vinyl groups have different lengths ranging from 2 carbons to 12 carbons. For example, 2(2,2':5',2"-terthien-5-yl)ethyl methacrylate (TTEMA) is prepared by esterification reaction between 2(2,2':5',2"-terthien-5-yl)ethanol (TTE) and methacryloyl chloride in the presence of triethylamine in dichloromethane, as shown in FIG. 2a. Another example is 2(2,2':5',2"-terthien-5-yl)ethyl norbornenate (TTENB), which is also prepared by esterification reaction between TTE and 5-norbornene-2-carbonyl chloride under the same experimental condition, as demonstrated in FIG. 2b.

As shown in the exemplary embodiments of the Examples below, the synthesis of side-chain π-conjugated aromatic/heteroaromatic oligomer-containing polymers has also been demonstrated by free radical polymerization and/or controlled/living polymerization methods (RAFT, ROMP, etc., such as those described in U.S. Publication No. 2012/0214950 of Tang, et al. filed on Feb. 15, 2012; U.S. Publication No. 2012/0041163 of Tang, et al. filed on Aug. 15, 2011; and U.S. Publication No. 2011/0086979 of Tang filed on Oct. 8, 2010, the disclosures of which are incorporated by reference herein).

For example, TTEMA based homopolymers can be prepared by reversible addition fragmentation transfer (RAFT), following the synthetic route by adopting azobisisobutyronitrile (AIBN) as the initiator and cumyl dithiobenzoate (CDB) as the transfer agent, as illustrated in FIG. 2(a). Another example is TTENB based homopolymers, which are prepared by ring-opening metathesis polymerization (ROMP), using Grubbs III as catalyst, as displayed in FIG. 2(b). The molecular weight of such homopolymers is in the range of 1,000 g/mol to 1,000,000 g/mol. These polymers can be tuned by changing the linkers between aromatic/heteroaromatic oligomer and vinyl groups, or by altering the nature of the oligomer and/or the number of the repeat units.

Figure 4:
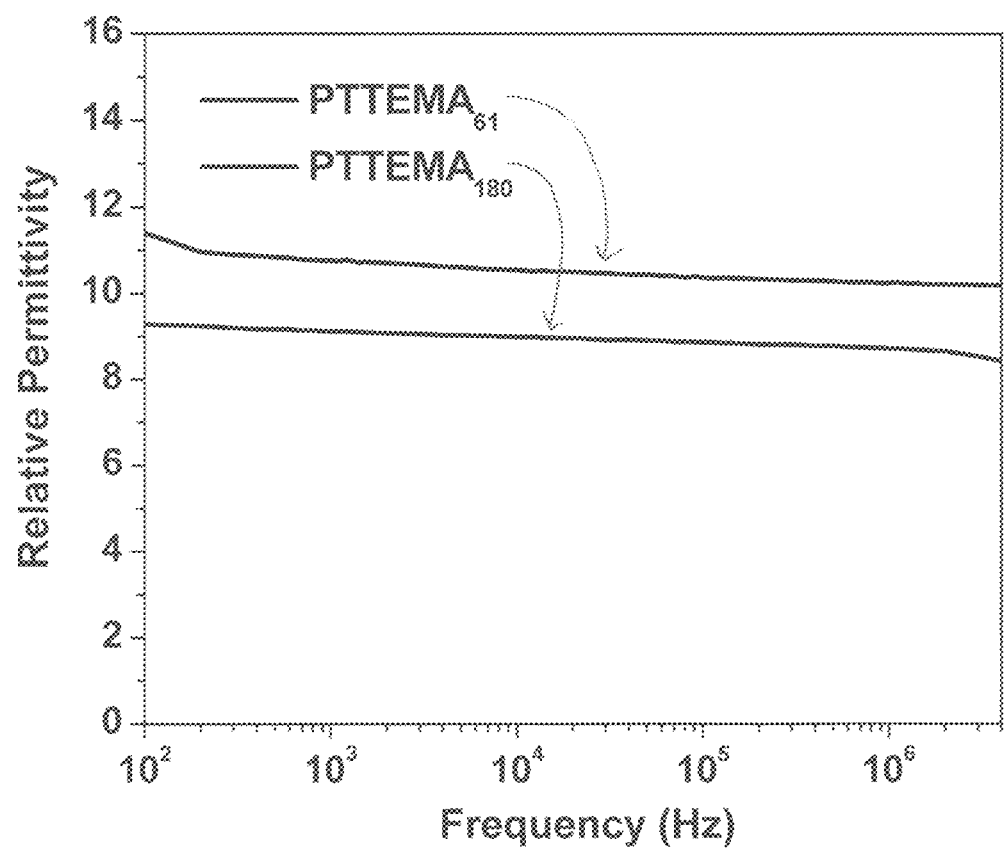
FIG. 4 shows the relative permittivity versus frequency for exemplary π-conjugated aromatic/heteroaromatic oligomer-containing homopolymers.
Figure 5:
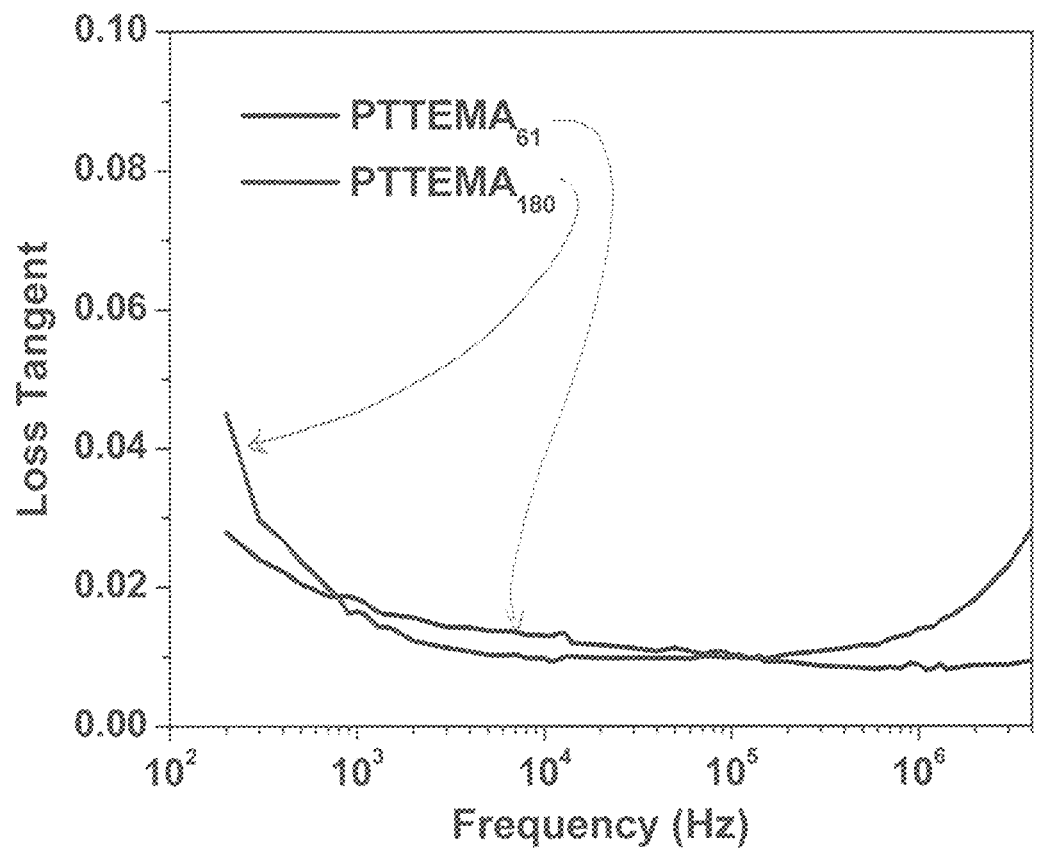
FIG. 5 shows the loss tangent (dielectric loss) versus frequency for exemplary π-conjugated aromatic/heteroaromatic oligomer-containing homopolymers.

The dielectric properties of the side-chain π-conjugated aromatic/heteroaromatic oligomer-containing homopolymers have also been characterized. For example, two representatives with different molecular weights exhibit favorable dielectric properties, especially the one with relatively lower molecular weight, possessing a dielectric constant from about 11.4 to about 10.2 and a low loss over a broad frequency range from about $10^2$ to about $4 \times 10^6$ Hz, as demonstrated in FIG. 4. Furthermore, the loss tangent for the two polymers is below 0.02 over the frequency range from about 1000 Hz to about 2 MHz (the loss tangent is in the range of about 0.009 to about 0.018 and about 0.016 to about 0.018 for PTTEMA$_{61}$ and PTTEMA$_{180}$, respectively). Even at 4 MHz, the loss tangent are only 0.009 and 0.028 for PTTEMA$_{61}$ and PTTEMA$_{180}$, respectively, as shown in FIG. 5.

Thus, the methods presented can offer the following key features:

1. π-Conjugated aromatic/heteroaromatic oligomer can be integrated as part of vinyl monomer units.

2. The π-conjugated aromatic/heteroaromatic oligomer side-chain moiety can be five-/six-membered aromatic/heteroacromatic oligomers and their derivatives, which include both linear and cyclic aromatic/heteroacromatic oligomers, and various fused aromatic/heteroacromatic oligomers, with repeat unit number ranging from 2 to 12, etc.

3. π-Conjugated aromatic/heteroaromatic oligomer-containing vinyl monomers used for preparation of side-chain aromatic/heteroaromatic oligomer-containing polymers by controlled/living radical polymerization methods (RAFT, ROMP, etc.)
   a. Acrylic homopolymers; or
   b. Methacrylic homopolymers; or
   c. Styrenic homopolymers; or
   d. Acrylamide homopolymers; or
   e. Norbornene homopolymers.

4. Side-chain π-conjugated aromatic/heteroaromatic oligomer-containing random copolymers.

5. Side-chain π-conjugated aromatic/heteroaromatic oligomer-containing block copolymers, including linear copolymers, star copolymers, bottle-brush copolymers, etc.

6. Dielectric properties of such π-conjugated aromatic/heteroaromatic oligomer-containing homopolymers and various copolymers.

The properties of π-conjugated aromatic/heteroaromatic oligomer-containing polymers can be tuned by changing the monomer structures (the polymerizable vinyl moiety, the linker or the aromatic/heteroaromatic oligomer moieties), compositions of various copolymers.

III. Polymer Grafted Nanomaterials

Methods are also generally provided for grafting a π-conjugated aromatic/heteroaromatic oligomer-containing polymer onto the surface of nanoparticles (e.g., BaTiO$_3$ (BT), TiO$_2$ZrO$_2$, calcium copper titanate (CCTO), etc.), carbon nanotubes, graphite, or other suitable nanomaterials. The surface-modification with polymers can be accomplished by using surface-initiated free radical polymerization and/or controlled/living polymerization methods. The resulting surface modified nanoparticles, nanotubes, and graphite could be used in the formation of nanocomposite materials.

In one embodiment, methods are provided for the surface-initiated polymerization of side-chain π-conjugated aromatic/heteroaromatic oligomer-containing polymers onto various nanoparticles, nanotube and graphite by free radical polymerization and controlled/living polymerization methods.

These polymers can be tuned by changing the linkers between aromatic/heteroaromatic oligomer and vinyl groups, or by altering the nature of the oligomer and/or the number of the repeat units as discussed above.

Figure 6:
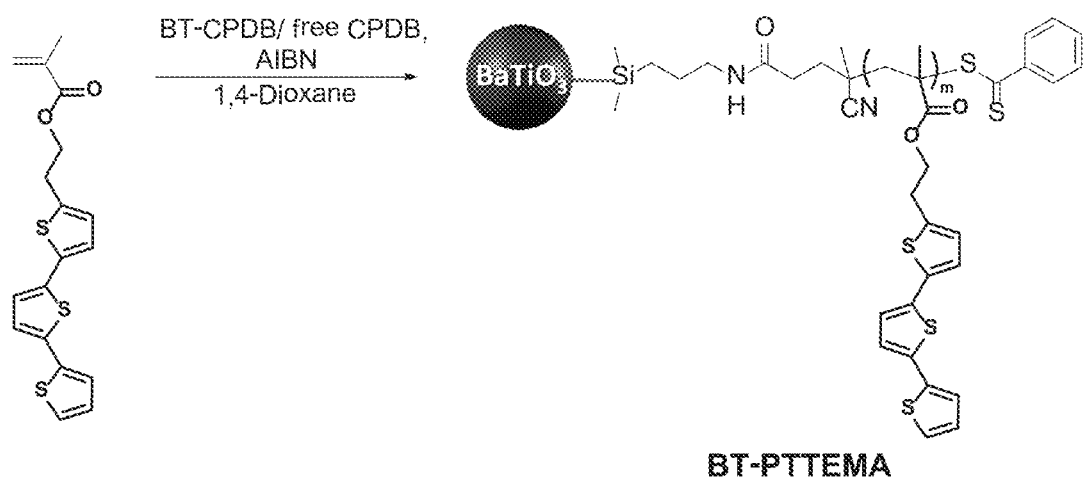
FIG. 6 shows an exemplary method of preparation of surface-initiated polymerization of a π-conjugated aromatic/heteroaromatic oligomer-containing methacrylic monomer, 2(2,2':5',2"-terthien-5-yl)ethyl methacrylate (TTEMA), onto a $BaTiO_3$ nanoparticle.

For example, TTEMA based homopolymers can polymerized onto the surface of BaTiO$_3$ nanoparticles by reversible addition fragmentation transfer (RAFT), following the synthetic route by adopting azobisisobutyronitrile (AIBN) as the initiator and cumyl dithiobenzoate (CDB) modified BaTiO$_3$ nanoparticles as the transfer agent, as illustrated in FIG. 6.

The molecular weight of such polymers can be in the range of about 1,000 g/mol to about 1,000,000 g/mol.

a. Nanoparticles:

The presently disclosed methods can be utilized on a variety of different types of nanoparticles. The nanoparticle may comprise, for example, natural or synthetic nanoclays (including those made from amorphous or structured clays), inorganic metal oxides (e.g., silica, alumina, and the like), nanolatexes, organic nanoparticles, etc. Particularly suitable nanoparticles include inorganic nanoparticles, such as silica, alumina, titania (TiO$_2$), indium tin oxide (ITO), CdSe, barium titanate (BaTiO$_3$), etc., or mixtures thereof. Suitable organic nanoparticles include polymer nanoparticles, carbon, graphite, graphene, carbon nanotubes, virus nanoparticles, etc., or mixtures thereof.

Nanoparticles, as used herein, means particles (including but not limited to rod-shaped particles, disc-shaped particles, platelet-shaped particles, tetrahedral-shaped particles), fibers, nanotubes, or any other materials having at least one dimension on the nano scale. In one embodiment, the nanoparticles have an average particle size of about 1 nanometer to about 1000 nanometers, preferably 2 nanometers to about 750 nanometers. That is, the nanoparticles have a dimension (e.g., an average diameter or length) of about 1 to 1000 nm. Nanotubes can include structures up to 1 centimeter long, alternatively with a particle size from about 2 to about 50 nanometers. Due to their size, nanoparticles have very high surface-to-volume ratios.

The nanoparticles may be crystalline or amorphous. A single type of nanoparticle may be used, or mixtures of different types of nanoparticles may be used. If a mixture of nanoparticles is used they may be homogeneously or non-homogeneously distributed in the composite material or a system or composition containing the composite material. Non-limiting examples of suitable particle size distributions of nanoparticles are those within the range of about 2 nm to less than about 750 nm, alternatively from about 2 nm to less than about 200 nm, and alternatively from about 2 nm to less than about 150 nm.

It should also be understood that certain particle size distributions may be useful to provide certain benefits, and other ranges of particle size distributions may be useful to provide other benefits (for instance, color enhancement requires a different particle size range than the other properties). The average particle size of a batch of nanoparticles may differ from the particle size distribution of those nanoparticles. For example, a layered synthetic silicate can have an average particle size of about 25 nanometers while its particle size distribution can generally vary between about 10 nm to about 40 nm.

In one embodiment, the nanoparticles can be exfoliated from a starting material to form the nanoparticles. Such starting material may have an average size of up to about 50 microns (50,000 nanometers). In another embodiment, the nanoparticles can be grown to the desired average particle size.

b. Attaching an Anchoring Compound to the Nanoparticle:

In certain embodiments, an anchoring compound can be attached to the surface of the nanoparticle for subsequent attachment of the polymeric chain (e.g., via a "grafting-from" or "grafting-to" approach, as described in greater detail below). The anchoring compound is covalently bonded to the surface of the nanoparticle, either directly or via a functionalization group.

The particular anchoring compound can be selected based upon the type of nanoparticle. Generally, the anchoring compound has a functional group for further reaction to the polymer chain. For example, an anchoring compound can have an amino-functionalization attached to the surface of a nanoparticle. In one embodiment, the amino-functionalization of the nanoparticles (i.e., attachment of amine groups to the nanoparticles) can be achieved through reaction of the nanoparticles with a mono-functional silane anchoring compound (e.g., 3-aminopropyldimethylmethoxysilane or 3-aminopropyldimethylethoxysilane). Use of a mono-functional silane as the anchoring compound, such as 3-aminopropyldimethylmethoxysilane or 3-aminopropyldimethylethoxysilane, compared to a difunctional or trifunctional silanes ensures the formation of a monolayer of anchoring agent on the silica surface and helps to prevent particle agglomeration by crosslinking during processing. However, mono-functional, di-functional, and tri-functional silanes are all suitable for use as an anchoring compound in the presently disclosed methods.

No matter the particular silane (i.e., mono-functional, di-functional, or tri-functional, etc.), the ratio of the silane to the nanoparticles is critical in determining the grafting density. In addition to adjusting the ratio by varying the concentration of the mono-functional silane, addition of a small amount of an inert dimethylmethoxy-n-octylsilane can help to partially cover the nanoparticle surface by inert alkyl groups and to help tune the grafting density along with helping to prevent aggregation of the nanoparticles.

c. Attaching a Polymer Chain to the Anchoring Compound:

In a preferred embodiment, to prepare the polymer grafted nanoparticles, a RAFT agent is employed for the polymerization of the π-conjugated aromatic/heteroaromatic oligomer-containing vinyl monomers. Any suitable RAFT agents can be utilized, including those RAFT agents in any of the RAFT classes (e.g., xanthates, dithiocarbamates, trithiocarbonates, and dithioesters).

Two methods can be utilized to form the π-conjugated aromatic/heteroaromatic oligomer-containing polymer chain extending from the nanoparticles via the anchoring compound: a "grafting-from" approach and a "grafting-to" approach. These strategies will be explained in more details in the following sections.

i. "Grafting-From" Methods

In one embodiment, the π-conjugated aromatic/heteroaromatic oligomer-containing polymer chain can be formed by polymerizing a plurality of monomers on the anchored RAFT agent attached to the anchoring compound on the surface of the nanoparticle, with the plurality of monomers comprising at least one of the π-conjugated aromatic/heteroaromatic oligomer-containing vinyl monomers described above. This polymerization results in the π-conjugated aromatic/heteroaromatic oligomer-containing polymer chain being covalently bonded to the surface of the nanoparticle via the anchoring compound.

The particular types of monomer(s) and/or polymerization technique can be selected based upon the desired polymeric chain to be formed. For example, for RAFT polymerization, π-conjugated aromatic/heteroaromatic oligomer-containing vinyl monomers can be polymerized either alone (i.e., substantially free from any other types of monomers) or in combination with a co-monomer.

Thus, the "grafting-from" method involves formation of the π-conjugated aromatic/heteroaromatic oligomer-containing polymer chain onto the anchoring compound and results in the π-conjugated aromatic/heteroaromatic oligomer-containing polymeric chain being covalently bonded to the nanoparticle via the anchoring compound (and, if present, a first functionalization compound).

ii. "Grafting-To" Methods

Alternatively, the polymeric chain can be first polymerized and subsequently covalently bonded to the surface of the nanoparticle, either directly or via an anchoring compound (and, if present, a functionalization compound). Thus, in this embodiment, the polymeric chain has been polymerized prior to attachment to the anchoring compound.

In this embodiment, the polymeric chain is not limited to the type of polymerization and/or types of monomer(s) capable of being polymerized directly to the anchoring compound. As such, as long as the polymeric chain defines a functional group that can react and bond to the anchoring compound, any polymeric chain can be bonded to the nanoparticle.

For example, when polymerized utilizing a RAFT agent, then a reactive end group of the polymer chain (i.e., the RAFT agent group) can react/attach to the anchoring compound.

iii. Reversible Addition-Fragmentation Chain Transfer Polymerization

Reversible Addition-Fragmentation chain Transfer polymerization (RAFT) is one type of controlled radical polymerization. RAFT polymerization uses thiocarbonylthio compounds, such as dithioesters, dithiocarbamates, trithiocarbonates, and xanthates, in order to mediate the polymerization via a reversible chain-transfer process. RAFT polymerization can be performed by simply adding a chosen quantity of appropriate RAFT agents (thiocarbonylthio compounds) to a conventional free radical polymerization.

Typically, a RAFT polymerization system includes the monomer, an initiator, and a RAFT agent (also referred to as a chain transfer agent). Because of the low concentration of the RAFT agent in the system, the concentration of the initiator is usually lower than in conventional radical polymerization. Suitable radical initiators can be azobisisobutyronitrile (AIBN), 4,4'-azobis(4-cyanovaleric acid) (ACVA), etc.

RAFT agents are generally thiocarbonylthio compounds, such as generally shown in Formula 1 below:

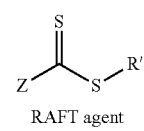

Formula 1

RAFT agent where the Z group primarily stabilizes radical species added to the C=S bond and the R' group is a good homolytic leaving group which is able to initiate monomers. For example, the Z group can be an alkyl group, an aryl group (e.g., phenyl group, benzyl group, etc.), a thiol group (e.g., R—S—, with R being H or any suitable organic group, such as alkyl, aryl, etc), an amine group (e.g., R$_2$N—, with each R group being independently H or any suitable organic group, such as alkyl, aryl, etc), an oxy group (R—O—, with R being any suitable organic group, such as alkyl, aryl, etc), etc. The R' group can be an organic chain terminating with a carboxylic acid group, a carboxylic derivative, an alkyne group, an azide group, an alcohol group, an alkene group, or another group that is reactive with the functional group of the particular anchoring compound attached to the nanoparticle. That is, in one particular embodiment, the functional group of the anchoring compound present on the nanoparticle is reactive with the R' group of the RAFT agent to ensure sufficient covalent bonding therebetween.

As stated, RAFT is a type of living polymerization involving a conventional radical polymerization in the presence of a reversible chain transfer reagent. Like other living radical polymerizations, there is minimized termination step in the RAFT process. The reaction is started by radical initiators (e.g., AIBN). In this initiation step, the initiator reacts with a monomer unit to create a radical species which starts an active polymerizing chain. Then, the active chain reacts with the thiocarbonylthio compound, which kicks out the homolytic leaving group (R'). This is a reversible step, with an intermediate species capable of losing either the leaving group (R') or the active species. The leaving group radical then reacts with another monomer species, starting another active polymer chain. This active chain is then able to go through the addition-fragmentation or equilibration steps. The equilibration keeps the majority of the active propagating species into the dormant thiocarbonyl compound, limiting the possibility of chain termination. Thus, active polymer chains are in equilibrium between the active and dormant species. While one polymer chain is in the dormant stage (bound to the thiocarbonyl compound), the other is active in polymerization.

By controlling the concentration of initiator and thiocarbonylthio compound and/or the ratio of monomer to thiocarbonylthio compound, the molecular weight of the polymeric chains can be controlled with low polydispersities.

Depending on the target molecular weight of final polymers, the monomer to RAFT agent ratios can range from about less than about 10 to more than about 20,000 (e.g., about 5,000 to about 15,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. In particular embodiments, the reaction temperature can range from about 25° C. to about 100° C., and the reaction time can be from less than about 1 h to about 72 h.

The RAFT process allows the synthesis of polymers with specific macromolecular architectures such as block, gradient, statistical, comb/brush, star, hyperbranched, and network copolymers. Because RAFT polymerization is a form of living radical polymerization, it is ideal for synthesis of block copolymers. For example, in the copolymerization of two monomers (A and B) allowing A to polymerize via RAFT will exhaust the monomer in solution with significantly suppressed termination. After monomer A is fully reacted, the addition of monomer B will result in a block copolymer. One requirement for maintaining a narrow polydispersity in this type of copolymer is to have a chain transfer agent with a high transfer constant to the subsequent monomer (monomer B in the example).

Using a multifuntional RAFT agent can result in the formation of a star copolymer. RAFT differs from other forms of CLPs because the core of the copolymer can be introduced by functionalization of either the R group or the Z group. While utilizing the R group results in similar structures found using ATRP or NMP, the use of the Z group makes RAFT unique. When the Z group is used, the reactive polymeric arms are detached from the core while they grow and react back into the core for the chain-transfer reaction.

iv. Deactivating the Butadiene-Derived Polymer Chain:

No matter the method used to attach the polymeric chain to anchoring compound on the nanoparticle, upon attachment, the polymeric chain is, in one particular embodiment, deactivated to prevent further polymerization thereon.

For example, if the "grafting-from" method was utilized to attach the polymeric chain to the anchoring compound via polymerization through a CRP technique (e.g., RAFT), a deactivation agent can be attached to, or reacted with, the end of each polymeric chain to inhibit further polymerization thereon. The deactivation agents can be selected based upon the type of polymerization and/or the type(s) of monomers utilized, but can generally include but are not limited to amines, peroxides, or mixtures thereof.

On the other hand, if the "grafting-to" method was utilized to attach the polymeric chain to the anchoring compound via attaching a pre-formed polymeric chain, the polymeric chain can be deactivated after or before covalently bonding the polymeric chain to the anchoring compound. Alternatively, the polymeric chain can be deactivated prior to covalently bonding the polymeric chain to the anchoring compound.

The deactivation of the polymeric chain can be achieved by any suitable process. In one embodiment, the polymer chain can be cleaved. Alternatively, the end of the polymer chain can be deactivated. For example, when formed via RAFT polymerization, the types of reactions that can be used to convert RAFT agents to deactivated end groups include reactions with diazo compounds, reactions with nucleophilic reagents such as primary amines, and reactions with oxidation agents which cleave the RAFT agent off the chain end and form an oxidized sulfur group such as sulfonic acid.

EXAMPLES

Examples of π-conjugated aromatic/heteroaromatic oligomer vinyl monomers and their polymers are described below.

Example 1

This example is to prepare π-conjugated aromatic/heteroaromatic oligomer-containing methacrylic monomers (FIG. 2(a)). A typical procedure for the synthesis is described as follows: aromatic/heteroaromatic oligomer terminated with alkyl alcohol moiety and methacryloyl chloride are dissolved in dichloromethane, followed by adding triethylamine dropwise under the protection of nitrogen gas at 0° C. The resulting mixture is stirred at room temperature overnight to yield the monomer TTEMA.

Example 2

This example is to prepare π-conjugated aromatic/heteroaromatic oligomer-containing methacrylic monomer based homopolymers. The monomers are polymerized by controlled/living radical polymerization (RAFT) using AIBN as initiators and CDB as the RAFT agent. The polymerization of TTEMA is carried out by the following procedures: in a dry Schlenk flask, TTEMA, CDB and AIBN are dissolved in 1,4-dioxane, followed by freeze-pump-thaw for several cycles and purging with nitrogen gas. The mixture is heated at 80~90° C. for 8~36 h to yield side-chain aromatic/heteroaromatic oligomer-containing homopolymers (FIG. 2(a)).

Example 3

Figure 2B:
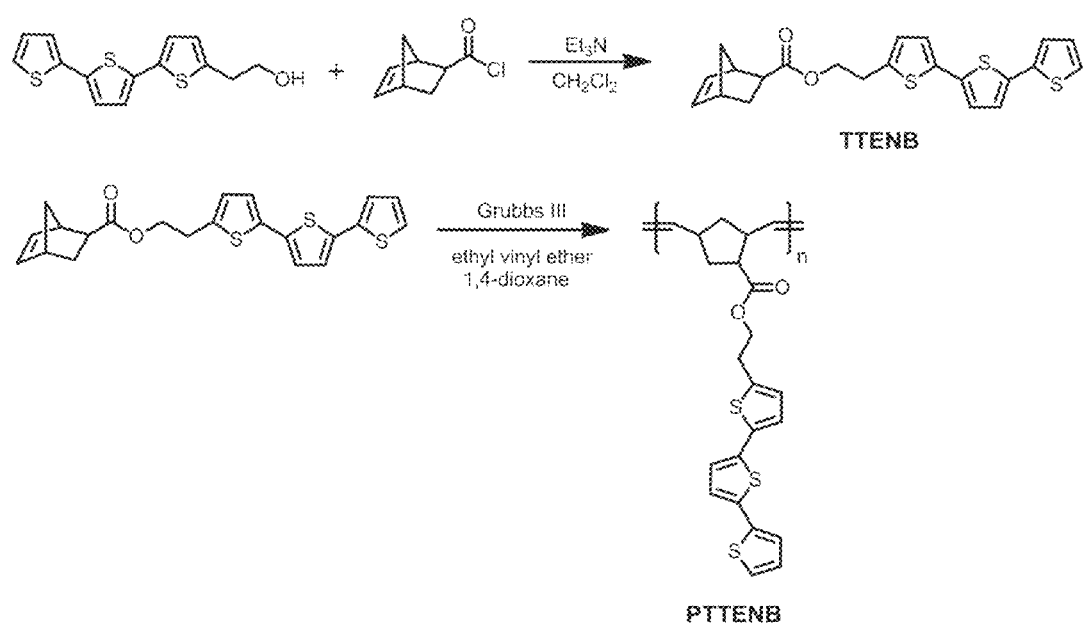
FIG. 2b shows an example of preparation of a π-conjugated aromatic/heteroaromatic oligomer-containing norbornene monomer, 2(2,2':5',2"-terthien-5-yl)ethyl norbornenate (TTENB) and an exemplary corresponding homopolymer.

This example is to prepare π-conjugated aromatic/heteroaromatic oligomer-containing norbornene monomers (FIG. 2(b)). A typical procedure for the synthesis is described as follows: aromatic/heteroaromatic oligomer terminated with alkyl alcohol moiety and 5-norbornene-2-carbonyl chloride are dissolved in dichloromethane, followed by adding triethylamine dropwise under the protection of nitrogen gas at 0° C. The resulting mixture is stirred at room temperature overnight to yield the monomer TTENB.

Example 4

This example is to prepare π-conjugated aromatic/heteroaromatic oligomer-containing norbornene monomer based homopolymers. The monomers are polymerized by ROMP using Grubbs III as the catalyst. The polymerization of TTENB is carried out by the following procedures: in a dry Schlenk flask, TTENB and Grubbs III catalyst are dissolved in 1,4-dioxane, followed by freeze-pump-thaw for several cycles and purging with nitrogen gas. The mixture is heated at 40~60° C. for 2~8 h to yield side-chain aromatic/heteroaromatic oligomer-containing homopolymers (FIG. 2(b)).

Example 5

This example is to prepare π-conjugated aromatic/heteroaromatic oligomer-containing methacrylic based homopolymers grafted onto BaTiO3 nanoparticles. The monomers are polymerized by controlled/living radical polymerization (RAFT) using AIBN as initiators and CDB-modified BaTiO3 nanoparticles as the RAFT agent. The polymerization of TTEMA is carried out by the following procedures: in a dry Schlenk flask, TTEMA, CDB-modified BaTiO3 nanoparticles and AIBN are dissolved in 1,4-dioxane, followed by freeze-pump-thaw for several cycles and purging with nitrogen gas. The mixture is heated at 80~90° C. for 8~36 h to yield side-chain aromatic/heteroaromatic oligomer-containing homopolymers (FIG. 3).

Figure 3:
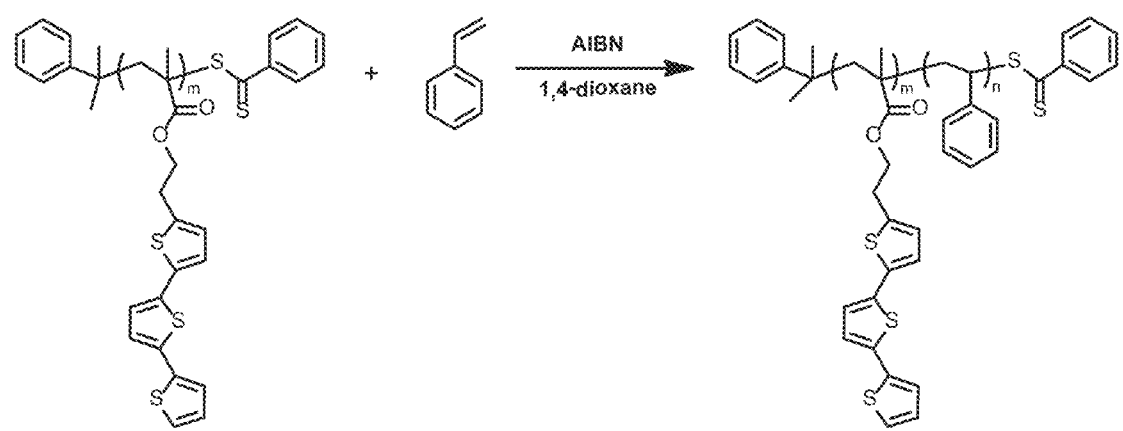
FIG. 3 shows an example of a side-chain π-conjugated aromatic/heteroaromatic oligomer-containing block copolymer prepared by controlled polymerization of TTEMA and styrene.

Example 6 his example is to prepare π-conjugated aromatic/heteroaromatic oligomer-containing block copolymers, PTTEMA-b-PS (FIG. 3). The procedures are similar to Example 2 as follows: in a dry Schlenk flask, PTTEMA and AIBN are dissolved in 1,4-dioxane, followed by freeze-pump-thaw for several cycles and purging with nitrogen gas. The mixture is stirred at 80~90° C. for 4~8 h to yield PTTEMA-b-PS diblock copolymers.

Example 7

As discussed above, Examples 1-5 demonstrate that nanodipolar π-conjugated oligomer thiophene-containing polymers exhibit high permittivity and low dielectric loss over a wide range of frequencies (100 Hz to about 10 MHz), which could be well suited for capacitor applications requiring high energy density and fast pulse power response.

Recently, aiming at further improving the dielectric performance and enhancing the energy storage capability of the oligomer thiophene-containing polymers, a new strategy was developed to prepare a series of π-conjugated oligomer containing polymers based nanocomposites by incorporation of hybrid barium titanate (BaTiO$_3$) nanoparticles with the polymers. The surface of the nanoparticles was modified with the same oligomer containing polymers as the matrix via surface-initiated reversible addition—fragmentation chain transfer (RAFT) polymerization. The advantage of this method is that the insulating oligomer containing polymer shells have exactly the same chemical structure and surface energy with the matrix, which not only could enhance the dispersion of BaTiO$_3$ nanoparticles but also could improve the interfacial adhesion between the nanoparticles and polymer matrix. At present, our preliminary results demonstrate that the resulting nanocomposite films exhibit much improved dielectric properties while maintaining relatively low dielectric loss. In sum, our novel conjugated aromatic/heteroaromatic oligomer-containing polymeric materials with superior dielectric properties are of great interest due to their potential applications as capacitor materials in portable electronic devices, hybrid electric vehicles, pulse power systems and energy storage.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:
1. A method grafting a π-conjugated aromatic/heteroaromatic oligomer-containing polymer onto a surface of a nanomaterial, the method comprising:
  polymerizing a π-conjugated aromatic/heteroaromatic oligomer-containing vinyl monomer via a free radical polymerization or a controlled/living radical polymerization method in the presence of an anchored nanomaterial, wherein the anchored nanomaterial comprises an anchoring group attached the surface of the nanomaterial, wherein the π-conjugated aromatic/heteroaromatic oligomer-containing vinyl monomer comprises:
    a polymerizable group, a linker group, and a π-conjugated aromatic/heteroaromatic side chain, and wherein the polymerizable group comprises a vinyl group, and further wherein the a π-conjugated aromatic/heteroaromatic side chain comprises:
    a first cyclopentadiene ring covalently attached to the linker group and having substituted or unsubstituted first hetero-atom substituted therein;
    one or more second cyclopentadiene ring(s) covalently attached to the first cyclopentadiene rings(s), wherein the second cyclopentadiene ring comprises a number (n) of repeating second cyclopentadiene rings(s) covalently bonded together in a chain, with n being an integer of 1 to about 25, and wherein each of the second cyclopentadiene rings has a substituted or unsubstituted second hetero-atom substituted therein; and
    a third cyclopentadiene ring positioned at a terminal end of the a π-conjugated aromatic/heteroaromatic side chain such that the second cyclopentadiene ring(s) is positioned between the first cyclopentadiene ring and the third cyclopentadiene ring, wherein the third cyclopentadiene ring has a substituted or unsubstituted third hetero-atom substituted therein.

2. The method as in claim 1, wherein the polymerizable group comprises an acrylic group or a methacrylic group, and wherein the controlled/living radical polymerization method is a RAFT polymerization method where the a π-conjugated aromatic/heteroaromatic oligomer-containing vinyl monomer is polymerized in the presence of a RAFT agent.

3. The method as in claim 1, wherein the a π-conjugated aromatic/heteroaromatic oligomer-containing vinyl monomer is polymerized without any other monomer present such that a homopolymer is formed.

4. The method as in claim 1, wherein the a π-conjugated aromatic/heteroaromatic oligomer-containing vinyl monomer is polymerized with another co-monomer present such that a copolymer is formed.

5. The method as in claim 4, wherein the copolymer is a random copolymer or a block copolymer.

6. The method as in claim 1 wherein polymerization is performed via a controlled/living polymerization method.

7. The method as in claim 1, wherein the one or more second cyclopentadiene ring(s) comprises the second cyclopentadiene rings covalently attached to the first cyclopentadiene ring, wherein the second cyclopentadiene ring(s) comprises a number (n) of repeating second cyclopentadiene rings covalently bonded together in a chain, with n being an integer of 2 to about 10, and wherein each of the second cyclopentadiene rings has a substituted or unsubstituted second hetero-atom substituted therein.

* * * * *